UNITED STATES PATENT OFFICE.

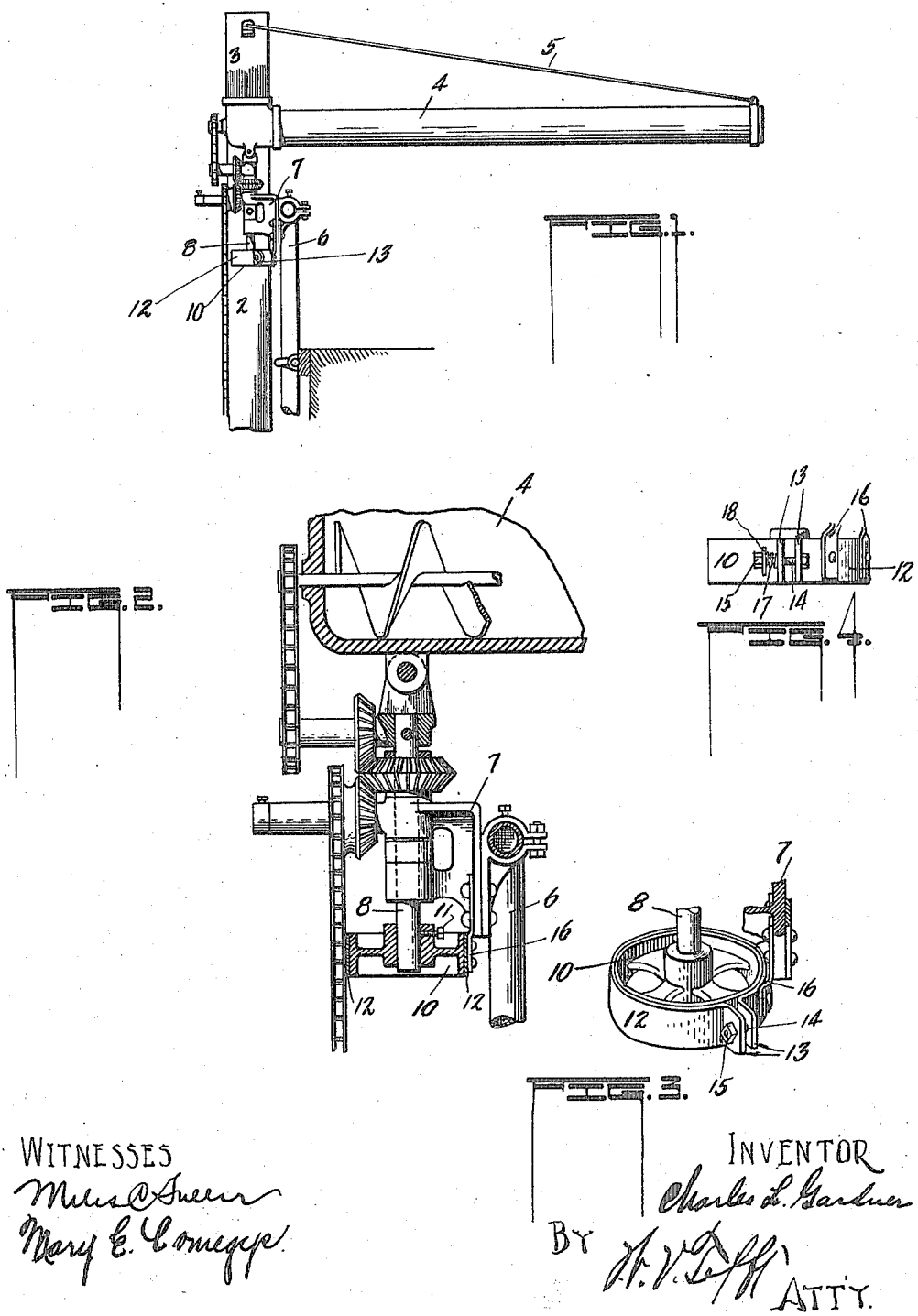

CHARLES L. GARDNER, OF OTTAWA, ILLINOIS.

FRICTION-STOP FOR SWINGING CONVEYERS.

1,184,942. Specification of Letters Patent. Patented May 30, 1916.

Application filed March 29, 1912. Serial No. 687,065.

*To all whom it may concern:*

Be it known that I, CHARLES L. GARDNER, a citizen of the United States, residing at Ottawa, in the county of La Salle and State of Illinois, have invented certain new and useful Improvements in Friction-Stops for Swinging Conveyers, of which the following is a specification.

My invention relates to a friction stop for swinging grain conveyers or spouts.

The object of my invention is to form a stop that under frictional tension will normally hold the spout in any position it may be placed, but the friction tension is adapted to be such, however, that under manual force the spout may be turned from side to side. The friction tension may be regulated.

My invention consists in the attachment to the centering support for the grain conveyer housing of a band wheel, an encircling band extending substantially around the band wheel provided with outwardly projecting lugs spaced some distance apart, a bolt engaging said lugs and a nut thereon for regulating the tension of the band upon the wheel and means for supporting the encircling band in connection with fixed mechanism upon supporting parts for the conveyer.

Referring to the drawings, Figure 1 is a side elevation of a conveyer housing, means for supporting the same in connection with a corn sheller body, driving connections, and particularly my present invention; Fig. 2 is a detail view showing in section a portion of the conveyer tube, means for supporting the same and in section my present invention; Fig. 3 is a perspective view showing my invention applied, and Fig. 4 is a modified form of my invention.

In the drawings, 2 is an elevator section adapted to be attached to a corn sheller, threshing machine or other grain handling device; 3 is the head section of the elevator; 4 refers generally to a conveyer housing; 5 is a supporting rod for the outer end of housing 4.

6 is a support connected with the grain handling machine.

7 is a bracket support connected with support 6 and adapted to receive and support in pivotal relation the spindle 8 which is connected with the grain conveyer housing.

Referring particularly to my invention, 10 is a band wheel adapted to be fixed to the lower end of spindle 8 by means of set screw 11.

12 is a friction band adapted to embrace the major portion of the circumference of band wheel 10 and is provided with the outturned lugs 13 properly spaced apart, as shown in the figures and provided with matching perforations.

14 is a bolt adapted to be carried through the perforations in lugs 13 and 15 is a nut on said bolt adapted to be operated to produce the clamping effect of friction band 12 upon band wheel 10.

16 are strap supports secured to friction band 12 and also to bracket 7.

In Fig. 4 I have shown a modified form of my structure which conforms in all particulars to the structure hereinbefore described except that I have added the spring 17 interposed between the outer face of one of lugs 13 and the washer 18. The spring as disclosed in Fig. 4 may be employed if desired. However, in general use, the device as applied has been found to meet the requirements of successful use.

I am aware that heretofore friction stop devices have been used and also know of one that has been heretofore patented; however, I know of no friction stop that has been patented or that is in use which has a permanent braking effect against movement of the conveyer and that does not require manual manipulation to produce the braking effect or the weight of grain passing through the conveyer.

I have shown herein one form of embodiment of my invention but it may be embodied in different forms to produce the same or substantially the same results, and therefore I do not desire to limit myself to the particular detail form herein set out but desire that the patent and claims therefor shall cover all forms of devices designed to be used for the same purpose that fall legitimately within the spirit and principle of the same.

What I claim is:

1. A friction stop for an oscillating supporting spindle comprising, in combination with the vertical spindle, of a bracket provided with bearings for sustaining the spindle, said bracket being adjustably mounted to permit change of position thereof and of the spindle, a friction wheel fixed on the lower end of said spindle to oscillate therewith, a divided friction band embracing the friction wheel and held continuously in contact with the periphery thereof, means for regulating and maintaining the frictional pressure between the band and the wheel, and fixed arms for supporting the friction band secured to said bracket and movable therewith.

2. A friction stop for an oscillating supporting spindle comprising, in combination with the vertical spindle, of a bracket provided with bearings for sustaining the spindle, said bracket being adjustably mounted to permit change of position thereof and of the spindle, a friction wheel fixed on the lower end of said spindle to oscillate therewith, a divided friction band embracing the friction wheel and held continuously in contact with the periphery thereof, means for regulating and maintaining the frictional pressure between the band and the wheel, fixed arms for supporting the friction band secured to said bracket and movable therewith, and gearing mounted on the bracket and spindle to transmit continuous rotary motion from a relatively stationary driving source to a driven part supported on the upper end of the spindle and oscillating with the spindle.

3. A friction stop for an oscillating supporting spindle comprising, in combination with the supporting spindle of a bracket provided with bearings for sustaining the spindle, said bracket being adjustably mounted to permit change of position of the spindle, a yoke fixed on the upper end of the spindle, and a friction wheel fixed on the lower end of the spindle to oscillate therewith, a divided friction band embracing the friction wheel and held continuously in contact with the periphery thereof, means for regulating and maintaining the frictional pressure between the band and the wheel, fixed arms for supporting the friction band secured to said bracket and movable therewith, a stub shaft projecting horizontally from the bracket, a similar shaft projecting from the yoke, and intermeshing gearing mounted on the spindle and the two stub shafts to transmit continuous rotary motion from a relatively stationary driving source to a driven part supported on the upper end of the spindle and oscillating with the spindle.

In testimony whereof I have affixed my signature in presence of two witnesses.

CHARLES L. GARDNER.

Witnesses:
N. C. VITTURN,
R. E. BOWERS.

Copies of this patent may be obtained for five cents each, by addressing the "Commissioner of Patents, Washington, D. C."